United States Patent

[11] 3,580,230

[72] Inventors Heinrich Hoffmann
Stuttgart-Geroksruhe;
Wilhelm Wagner, Stuttgart-O, Germany
[21] Appl. No. 764,734
[22] Filed Oct. 3, 1968
[45] Patented May 25, 1971
[73] Assignee Daimler-Benz Aktiengesellschaft
Stuttgart-Unterturkheim, Germany
[32] Priority Oct. 5, 1967
[33] Germany
[31] P 15 76 008.4

[54] AIR-COMPRESSING INJECTION-TYPE INTERNAL COMBUSTION ENGINE WITH EXTERNALLY CONTROLLED IGNITION AND QUALITY REGULATION
23 Claims, 4 Drawing Figs.
[52] U.S. Cl. .................................................. 123/32SPA,
123/30
[51] Int. Cl. .................................................... F02b 19/10
[50] Field of Search .......................................... 123/32, 32
(SPA), 32 (STR), 75 (B), 143 (B)

[56] References Cited
UNITED STATES PATENTS

| | | | |
|---|---|---|---|
| 2,779,319 | 1/1957 | Goschel ......................... | 123/32 |
| 2,849,992 | 9/1958 | Stillebroer et al. ............ | 123/32 |
| 2,893,360 | 7/1959 | Muller .......................... | 123/32 |
| 2,902,011 | 9/1959 | Hoffmann ...................... | 123/32 |
| 3,107,658 | 10/1963 | Meurer .......................... | 123/32 |
| 3,304,922 | 2/1967 | Hideg ............................ | 123/32 |
| 2,758,576 | 8/1956 | Schlamann ..................... | 123/32(STR) |

*Primary Examiner*—Laurence M. Goodridge
*Attorney*—Craig, Antonelli, Stewart & Hill ABSTRACT: An air-compressing internal combustion engine with externally controlled ignition and quality regulation which includes an at least approximately axially symmetrical combustion space arranged in the piston, in which an air rotary movement about the combustion space axis is present toward the end of the compression stroke, and which includes an injection system which injects fuel against the wall of the combustion space approximately in the direction of the air movement and approximately tangentially with a nonnegligible free length of the jet so that the fuel thus injected into the piston combustion space flows along the walls thereof; an auxiliary combustion space is arranged in the cylinder head which includes an injection nozzle and an ignition source whereby the auxiliary combustion space has the shape of an approximately semispherically shaped recess containing about 5 to 20 percent of the entire combustion space volume; the auxiliary combustion space is arranged within the area of a circumferential place of the piston combustion space while the injection nozzle is so arranged and constructed in the auxiliary combustion space that in addition to the partial fuel quantity injected into the piston combustion space a further partial fuel quantity is injected obliquely against the wall parts of the auxiliary combustion space.

Patented May 25, 1971

INVENTORS
HEINRICH HOFFMANN
WILHELM WAGNER

BY Craig & Antonelli

ATTORNEYS

Patented May 25, 1971

INVENTORS
HEINRICH HOFFMANN
WILHELM WAGNER

BY Craig & Antonelli

ATTORNEYS

AIR-COMPRESSING INJECTION-TYPE INTERNAL COMBUSTION ENGINE WITH EXTERNALLY CONTROLLED IGNITION AND QUALITY REGULATION

The present invention relates to an air-compressing injection-type internal combustion engine with externally controlled ignition and quality regulation and having an at least approximately axially symmetrical combustion space arranged in a piston, in which a rotary movement of the air about the combustion axis, produced by conventional means, is present toward the end of the compression stroke, and against the wall of which fuel impinges approximately in the direction of the air movement and approximately tangentially with a nonnegligible free length of the jet and sweeps along this wall, and which includes an auxiliary combustion space arranged in the cylinder head and having an injection nozzle and ignition source.

Engines of the aforementioned type require that an ignitable fuel-air mixture is present at the ignition source at the moment of ignition independently of load and rotational speed and therewith of the injected fuel quantity. The same problem also exists in air-compressing injection-type internal combustion engines with self-ignition and quality regulation during operation with fuels having strongly different ignition qualities, where it is desirable with the use of fuels of good ignition quality (diesel oil) to be able to operate with auto ignition and with fuels of relatively poor ignition quality to operate with externally controlled ignition. It is furthermore desirable with the same type of engine construction to utilize an externally controlled ignition for the purpose of improving the starting and warmup behavior which after termination of the starting or warmup operation is turned off.

Accordingly, the present invention is concerned with the task to supply the fuel quantity which varies in its quantity depending on load and rotational speed, into the cylinder space in such a manner that independently of the prevailing load of the internal combustion engine an ignitable mixture is always accumulated and available at the ignition source.

The underlying problems are solved in accordance with the present invention essentially in that the auxiliary combustion space has the shape of an approximately semispherically shaped recess with a volume amounting to about 5 to 20 percent of the entire combustion space and is arranged within the area of a circumferential place of the piston combustion space, and in that the injection nozzle is so arranged in the auxiliary combustion space and is also so constructed that in addition to a partial fuel quantity injected into the piston combustion space, a further partial fuel quantity is injected obliquely against the wall part of the auxiliary combustion space.

It is achieved by this arrangement that with the injection taking place shortly before the ignition, a partial quantity of the fuel reaches the immediate area of the ignition source disposed in the auxiliary combustion space and is deposited and stored within this area at the wall of the auxiliary combustion space where it is initially removed from the direct interaction of the air eddy and can be ignited immediately after its redetachment by the ignition source in prepared vapor form. Nevertheless, a good scavenging of this space is assured by the relatively large opening of the auxiliary combustion space in relation to its volume.

According to different embodiments of the present invention, the injection nozzle may be constructed either as conventional two-apertured nozzle whose one aperture direction is directed obliquely against the wall of the auxiliary combustion space, or as pin-type nozzle whose jet cone is directed with a part of its conical surface against the wall part of the auxiliary combustion space. It is thereby advantageous in particular in the last-mentioned case if the auxiliary combustion space is provided at its edge with an internal annular shoulder constricting the aperture or opening at least over a part of its circumference because such an annular shoulder contributes to the fact that the fuel component which impinges at this place, impinges obliquely against the wall thereat and sweeps along the wall in order to improve thereby the preparation in a known manner. However, it is additionally achieved thereby at the same time that the fuel once applied against the wall does not drip off into the main combustion space and is held back in the auxiliary combustion space as ignition quantity.

The favorable preparation of the fuel component flowing or sweeping along the wall of the auxiliary combustion space can be further improved if the auxiliary combustion space, according to a further feature of the present invention, is cooled to a lesser extent compared to the remaining wall parts of the cylinder space and is constructed, for example, as heat insulation insert.

According to another equally preferred construction in accordance with the present invention, the auxiliary combustion space is disposed, in the projection directed toward the piston, with the larger portion of its aperture cross section still outside the piston combustion space above the part of the piston crown surrounding the same. It is achieved thereby that after the ignition, the flame front passes over into the main combustion space from the partially covered auxiliary combustion space with a higher velocity corresponding to the reduced auxiliary combustion space aperture or opening in a manner similar to a firing channel and thus effects a rapid burning-through of the entire charge.

According to a further feature of the present invention the internal dimension of the piston combustion space is offset to a somewhat smaller diameter directly above the bottom thereof whereby the annular shoulder formed thereby passes over into the upper lateral walls of the piston combustion space by way of an axially symmetrical, rounded off portion. In such an arrangement with injection of the fuel against the lateral wall area disposed above the annular shoulder, by far the most part of the fuel can be retained by the annular shoulder within the area of the upper lateral wall of the piston combustion space where the uncombusted combustion air sweeps continuously past and assures a good mixture formation and combustion. In particular, it is avoided thereby that the fuel flowing along the lateral wall can reach the central bottom area of the piston combustion space and from there into the hot center core of the combustion space filling itself with combustion gases.

The ignition source can be constructed either as spark plug or glow plug.

According to a still further feature of the present invention the compression ratio can be so selected that during operation of the internal combustion engine with fuels having good ignition quality, the external ignition is disengaged and the engine can be operated with auto-ignition. This is of advantage insofar as with such a type of internal combustion engine, fuels having a good ignition quality can be combusted with self-ignition or auto-ignition and fuels having a poor ignition quality with externally controlled ignition without the need that the compression ratio has to be selected very high in consideration of the fuels with relatively pronounced poor ignition quality as was necessary heretofore with internal combustion engines with self-ignition for multifuel operation.

Accordingly, it is an object of the present invention to provide an air-compression, injection-type internal combustion engine with externally controlled ignition and quality regulation which avoids by simple means the aforementioned shortcomings and drawbacks encountered in the prior art.

Another object of the present invention resides in an air-compressing, injection-type internal combustion engine of the type described above in which an ignitable mixture is always available at the ignition source independently of the load and rotational speed of the internal combustion engine.

A further object of the present invention resides in an internal combustion engine of the aforementioned type which not only improves the preparation of the fuel but additionally effects a rapid burning of the entire fuel charge.

Still a further object of the present invention resides in an internal combustion engine with fuel injection and externally controlled ignition which can be operated, dependent upon the type of fuel, either as engine with auto-ignition or as engine with externally controlled ignition without requiring relatively high compression ratios.

These and other objects, features and advantages of the present invention will become more obvious from the following description when taken in connection with the accompanying drawing which shows, for purposes of illustration only, two embodiments in accordance with the present invention, and wherein.

Figure 1:
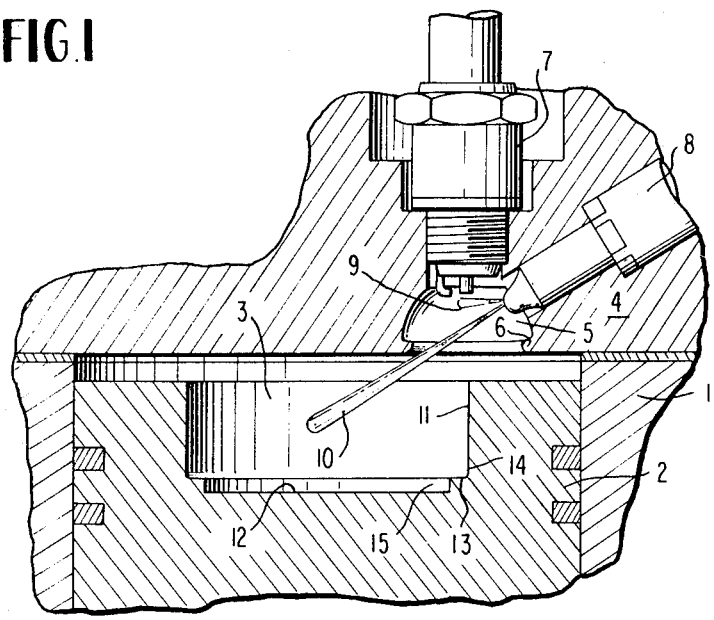
FIG. 1 is a partial longitudinal cross-sectional view through the portion of an injection-type internal combustion engine in accordance with the present invention which forms the entire combustion space thereof.

Referring now to the drawing wherein like reference numerals are used throughout the various views to designate like parts, in the internal combustion engine illustrated in FIG. 1, the piston 2 reciprocating in a conventional manner within the working cylinder 1 is provided with an axial, essentially cylindrical piston combustion space 3 whereas an auxiliary combustion space 5 constructed as approximately semispherically shaped recess is arranged within the cylinder head 4 of the internal combustion engine whose volume amounts to about 5 to 20 percent of the entire combustion space. The auxiliary combustion space 5 lies with its center just about over a rim or edge place of the piston combustion space 3, whence the auxiliary combustion space 5 is disposed, in the projection directed toward the piston 2, with the larger portion of its aperture cross section still outside of the piston combustion space 3 above the piston crown surrounding the piston combustion space 3, as can be seen in particular from FIG. 2.

Figure 2:
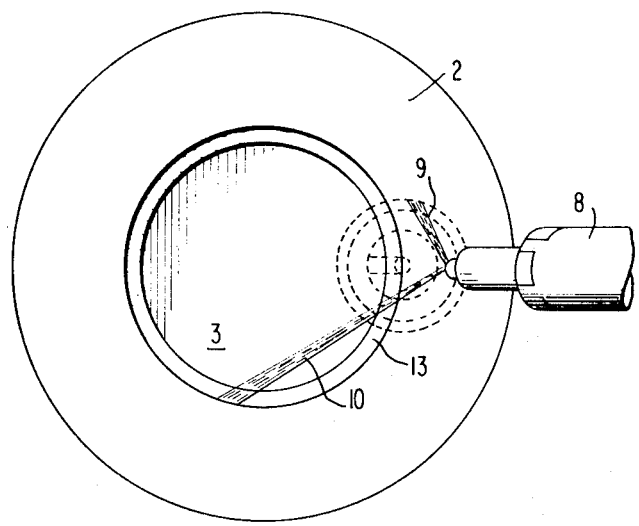
FIG. 2 is a plan view on the piston of FIG. 1, in which the injection nozzle arranged above the piston is also shown for the sake of clarity of the injection.

A spark plug 7 is arranged according to the illustrated embodiment at the bottom of the recess within the combustion space 5 provided at its edge with an internal annular shoulder 6 constricting the opening or aperture, and a two-aperture injection nozzle 8 is arranged in the lateral wall area disposed opposite the center of the piston combustion space 3 whose one jet 9 impinges obliquely against the wall of the auxiliary combustion space 5 and whose other jet 10 impinges obliquely against the upper lateral wall 11 of the piston combustion space 3. (FIG. 2)

The internal dimension of the piston combustion space 3 is offset to a smaller diameter close above the bottom 12 thereof, whereby the thus formed annular shoulder 13 passes over into the upper lateral wall 11 by way of an axially symmetrical rounded off portion 14. The lower lateral wall 15 of the piston combustion space 3 adjoins the inner edge of the annular shoulder 13 with the formation of a sharp edge.

During the operation of the described internal combustion engine the annular shoulder 6 of the auxiliary combustion space 5 prevents a dripping into the cylinder space of fuel injected into the auxiliary combustion space by means of the jet 9. Additionally, it is prevented by the annular shoulder 13 that the fuel injected obliquely against the upper lateral wall 11 of the piston combustion space 3 reaches the central area of the bottom 12 of the piston combustion space 3, from where it could reach the hot center core of the combustion space filling itself with combustion gases.

The compression ratio of the described internal combustion engine is so selected that during operation of the internal combustion engine with fuels having a good ignition quality, the externally controlled ignition is turned off and the engine can be operated with auto- or self-ignition. Furthermore, the internal combustion engine can be started and possibly can be warmed up with externally controlled ignition in order to operate the same subsequent thereto with auto- or self-ignition after turning off the externally controlled ignition.

Figure 3:
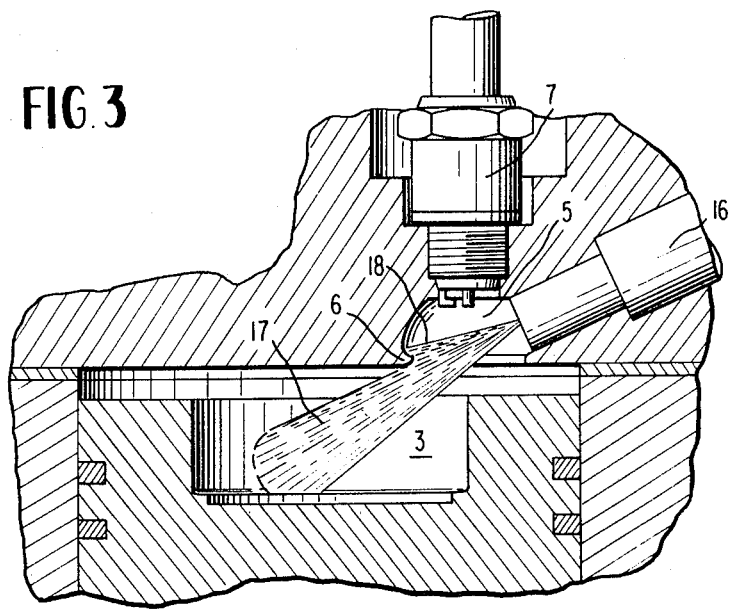
FIG. 3 is a partial longitudinal cross-sectional view, similar to FIG. 1, through a modified embodiment of the internal combustion engine in accordance with the present invention.
Figure 4:
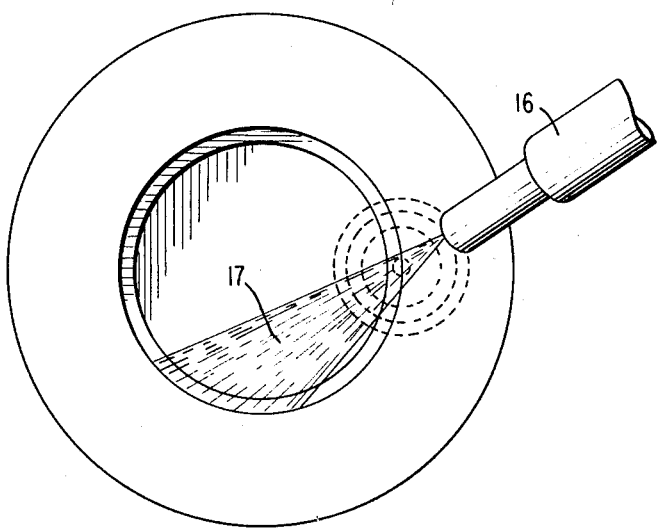
FIG. 4 is a plan view, similar to FIG. 2, on the piston of the internal combustion engine according to FIG. 3.

The internal combustion engine illustrated in FIGS. 3 and 4 and corresponding to the second embodiment, differs from the engine described so far in that, instead of an apertured nozzle, a pin-type nozzle 16 is provided as injection nozzle. The jet cone 17 of the pin-type nozzle 16 directed essentially into the piston combustion space 3 is directed with a portion of its conical surface still against the annular shoulder 6 of the auxiliary combustion space 5 whereby a partial quantity of the fuel is deflected by way of the annular shoulder 6 into the auxiliary combustion space 5 and is available thereat for the preparation of an ignitable mixture in front of the spark plug 7.

In the last-mentioned example the larger fuel proportion is injected into or supplied to the piston combustion space. However, it is also possible independently of the type of the injection nozzle used that the partial fuel quantity injected into the auxiliary combustion space is equal to or larger than the partial fuel quantity injected into the piston combustion space.

While we have shown and described several embodiments in accordance with the present invention it is understood that the same is not limited thereto but is susceptible of numerous changes and modifications as known to a person skilled in the art. For example, in order to accelerate the evaporation of the fuel injected against the auxiliary combustion space wall, the auxiliary combustion space can also be cooled to a lesser degree compared to the remaining wall parts of the cylinder space by conventional means and can be constructed, for example, as heat-insulated insert. Particularly for the case that an externally controlled ignition is necessitated only temporarily, for example, during starting and during the warmup of the internal combustion engine, a glow plug may also be provided as ignition source in lieu of a spark plug without in any way affecting the inventive concept.

Thus, it is obvious that the present invention is susceptible to numerous changes and modifications and we therefore do not wish to be limited to the details shown and described herein but intend to cover all such changes and modifications as are within the scope of those skilled in the art.

We claim:

1. An air-compressing injection-type internal combustion engine with externally controlled ignition and quality regulation, which is provided with an at least approximately axially symmetrical combustion space arranged in the piston, in which a rotary movement of the air about the combustion space axis is present toward the end of the compression stroke, and in which fuel impinges against the wall of the combustion space approximately in the direction of the air movement and approximately tangentially with a nonnegligible free length of the jet and flows along the wall of the combustion space, wherein the improvement comprises auxiliary combustion space means in the form of an approximately semispherically shaped recess which has its large cross section open to the cylinder and a volume amounting to about 5 to 20 percent of the entire combustion space volume and which is arranged within the area of the circumference of the piston combustion space to provide a direct communication with said combustion space when the piston is in the top dead center position, ignition means in said auxiliary combustion space means, and injection means in the auxiliary combustion space means for injecting into the compressed air having said rotary movement and approximately in the top dead center position of the piston, in addition to a partial fuel quantity injected into the piston combustion space through said communication at an acute angle to a plane perpendicular to the cylinder axis, a further partial fuel quantity obliquely against the wall portion of the auxiliary combustion space means.

2. An internal combustion engine according to claim 1, wherein the injection means includes an injection nozzle constructed as two-apertured nozzle whose one aperture direction is directed obliquely against the wall of the auxiliary combustion space means.

3. An internal combustion engine according to claim 1, wherein the injection means includes a pin-type injection nozzle whose jet cone is directed with a portion of its conical surface against wall parts of the auxiliary combustion space means.

4. An internal combustion engine according to claim 1, wherein the auxiliary combustion space means is provided along its edge with inner annular shoulder means constricting the aperture at least over a part of its circumference.

5. An internal combustion engine according to claim 4, wherein the auxiliary combustion space means is subjected to lesser cooling action in comparison to the remaining wall parts of the cylinder space.

6. An internal combustion engine according to claim 5, wherein said auxiliary combustion space means is constructed as heat-insulated insert means.

7. An air-compressing injection-type internal combustion engine with externally controlled ignition and quality regulation, which is provided with an at least approximately axially symmetrical combustion space arranged in the piston, in which a rotary movement of the air about the combustion space axis is present toward the end of the compression stroke, and in which fuel impinges against the wall of the combustion space approximately in the direction of the air movement and approximately tangentially with a nonnegligible free length of the jet and flows along the wall of the combustion space, wherein the improvement comprises auxiliary combustion space means in the form of an approximately semispherically shaped recess which has a volume amounting to about 5 to 20 percent of the entire combustion space volume and which is arranged within the area of a circumferential place of the piston combustion space, ignition means in said auxiliary combustion space means, and injection means in the auxiliary combustion space means for injecting, in addition to a partial fuel quantity injected into the piston combustion space, a further partial fuel quantity obliquely against the wall portion of the auxiliary combustion space means, said auxiliary combustion space means being provided along its edge with inner annular shoulder means constricting the aperture at least over a part of its circumference, the auxiliary combustion space means being subjected to a lesser cooling action in comparison to the remaining wall parts of the cylinder space and being constructed as heat-insulated insert means, and the auxiliary combustion space means, in the projection toward the piston, lying with the larger part of its aperture cross section still outside the piston combustion space above the part of the piston crown surrounding the same.

8. An internal combustion engine according to claim 7, wherein the internal dimension of the piston combustion space is offset directly above the bottom thereof to a somewhat smaller diameter, the annular shoulder means formed thereby passing over into the upper lateral walls of the piston combustion space by way of axially symmetrical rounded off surfaces.

9. An internal combustion engine according to claim 8, wherein the ignition means is a spark plug.

10. An internal combustion engine according to claim 8, wherein the ignition means is a glow plug.

11. An internal combustion engine according to claim 8, wherein the compression ratio of the engine is so selected that during operation of the internal combustion engine with a fuel having good ignition quality, the externally controlled ignition is turned off and the engine can be operated with the auto-ignition.

12. An internal combustion engine according to claim 8, wherein the injection means includes an injection nozzle constructed as two-apertured nozzle whose one aperture direction is directed obliquely against the wall of the auxiliary combustion space means.

13. An internal combustion engine according to claim 8, wherein the injection means includes a pin-type injection nozzle whose jet cone is directed with a portion of its conical surface against wall parts of the auxiliary combustion space means.

14. An internal combustion engine according to claim 1, wherein the auxiliary combustion space means is subjected to lesser cooling action in comparison to the remaining wall parts of the cylinder space.

15. An internal combustion engine according to claim 1, wherein said auxiliary combustion space means is constructed as heat-insulated insert means.

16. An air-compressing injection-type internal combustion engine with externally controlled ignition and quality regulation, which is provided with an at least approximately axially symmetrical combustion space arranged in the piston, in which a rotary movement of the air about the combustion space axis is present toward the end of the compression stroke, and in which fuel impinges against the wall of the combustion space approximately in the direction of the air movement and approximately tangentially with a nonnegligible free length of the jet and flows along the wall of the combustion space, wherein the improvement comprises auxiliary combustion space means in the form of an approximately semispherically shaped recess which has a volume amounting to about 5 to 20 percent of the entire combustion space volume and which is arranged within the area of a circumferential place of the piston combustion space, ignition means in said auxiliary combustion space means, and injection means in the auxiliary combustion space means for injecting, in addition to a partial fuel quantity injected into the piston combustion space, a further partial fuel quantity obliquely against the wall portion of the auxiliary combustion space means, in the projection directed toward the piston, lying with the larger part of its aperture cross section outside the piston combustion space above the part of the piston crown surrounding the same and the auxiliary combustion space means, in the projection directed toward the piston, lying with the larger part of its aperture cross section outside the piston combustion space above the part of the piston crown surrounding the same.

17. An internal combustion engine according to claim 16, wherein the internal dimension of the piston combustion space is offset directly above the bottom thereof to a somewhat smaller diameter, the annular shoulder means formed thereby passing over into the upper lateral walls of the piston combustion space by way of axially symmetrical rounded off surfaces.

18. An internal combustion engine according to claim 17, wherein the auxiliary combustion space means is provided along its edge with inner annular shoulder means constricting the aperture at least over a part of its circumference.

19. An internal combustion engine according to claim 1, wherein the compression ratio of the engine is so selected that during operation of the internal combustion engine with a fuel having good ignition quality, the externally controlled ignition is turned off and the engine can be operated with auto-ignition.

20. An air-compressing injection-type internal combustion engine with externally controlled ignition and quality regulation, which is provided with an at least approximately axially symmetrical combustion space arranged in the piston, in which a rotary movement of the air about the combustion space axis is present toward the end of the compression stroke, and in which fuel impinges against the wall of the combustion space approximately in the direction of the air movement and approximately tangentially with a nonnegligible free length of the jet and flows along the wall of the combustion space, wherein the improvement comprises auxiliary combustion space means in the form of an approximately semishperically shaped recess which has a volume amounting to about 5 to 20 percent of the entire combustion space volume and which is arranged within the area of a circumferential place of the piston combustion space, ignition means in said auxiliary combustion space means, and injection means in the auxiliary combustion space means for injecting, in addition to a partial fuel quantity injected into the piston combustion space, a further partial fuel quantity obliquely against the wall portion of the auxiliary combustion space means, the internal dimension of the piston combustion space being offset directly above the bottom thereof to a somewhat smaller diameter, and the annular shoulder means formed thereby passing over into the upper lateral walls of the piston combustion space by way of axially symmetrical rounded off surfaces.

21. An internal combustion engine according to claim 20, wherein the compression ratio of the engine is so selected that during operation of the internal combustion engine with a fuel having good ignition quality, the externally controlled ignition is turned off and the engine can be operated with auto-ignition.

22. An internal combustion engine according to claim 1, wherein said partial fuel quantity and said further fuel quantity are injected substantially in respective directions which subtend therebetween only an acute angle as viewed in an axial cross section containing the cylinder axis and passing substantially through the center of the auxiliary combustion space means.

23. An internal combustion engine according to claim 22, wherein said partial fuel quantity and said further fuel quantity are injected by said injection means in directions disposed on the same side of a plane which is substantially parallel to the cylinder axis and substantially perpendicular to said axial cross section.